(12) United States Patent
Bonin

(10) Patent No.: US 9,030,674 B2
(45) Date of Patent: May 12, 2015

(54) METHOD AND APPARATUS FOR SECURE CONTROL OF A ROBOT

(75) Inventor: Uwe Bonin, Friedberg (DE)

(73) Assignee: KUKA Roboter GmbH, Augsburg (DE)

( * ) Notice: Subject to any disclaimer, the term of this patent is extended or adjusted under 35 U.S.C. 154(b) by 17 days.

(21) Appl. No.: 13/393,386

(22) PCT Filed: Oct. 12, 2011

(86) PCT No.: PCT/EP2011/005124
§ 371 (c)(1),
(2), (4) Date: Jul. 2, 2012

(87) PCT Pub. No.: WO2012/059170
PCT Pub. Date: May 10, 2012

(65) Prior Publication Data
US 2012/0262727 A1    Oct. 18, 2012

(30) Foreign Application Priority Data

Nov. 5, 2010    (DE) .......................... 10 2010 050 547

(51) Int. Cl.
| | | |
|---|---|---|
| *G01B 11/14* | (2006.01) | |
| *B25J 19/06* | (2006.01) | |
| *B25J 9/16* | (2006.01) | |
| *B25J 19/02* | (2006.01) | |
| *F16P 3/14* | (2006.01) | |

(52) U.S. Cl.
CPC ............... *B25J 19/06* (2013.01); *B25J 9/1676* (2013.01); *B25J 9/1692* (2013.01); *B25J 19/022* (2013.01); *F16P 3/144* (2013.01)

(58) Field of Classification Search
CPC .... G01N 33/5008; G01N 33/502; H04N 3/14
USPC .................... 356/614; 700/245, 250
See application file for complete search history.

(56) References Cited

U.S. PATENT DOCUMENTS

| 4,602,163 | A | 7/1986 | Pryor | |
|---|---|---|---|---|
| 4,674,057 | A * | 6/1987 | Caughman et al. | ............. 73/625 |
| 6,907,388 | B2 * | 6/2005 | Suzuki et al. | ................. 340/511 |
| 7,812,879 | B2 * | 10/2010 | Liu et al. | ....................... 348/294 |

(Continued)

FOREIGN PATENT DOCUMENTS

| CN | 101168255 A | 4/2008 |
|---|---|---|
| CN | 101200066 A | 6/2008 |

(Continued)

OTHER PUBLICATIONS

European Patent Office; Search Report and Written Opinion in International Patent Application No. PCT/EP2011/005124 dated Jan. 27, 2012; 9 pages.

(Continued)

*Primary Examiner* — Kara E Geisel
*Assistant Examiner* — Iyabo S Alli
(74) *Attorney, Agent, or Firm* — Wood, Herron & Evans, LLP

(57) ABSTRACT

A device according to the invention (1) for monitoring the safety of at least one robot (2), having a non-contact detection apparatus (3A, 3B) for monitoring a working space (A) of at least one robot (2) in a monitoring mode (FIG. 1), is characterized by a switching means (1) for switching the detection apparatus into a measuring mode (FIG. 2) to measure at least one robot (2).

16 Claims, 1 Drawing Sheet

(56) References Cited

U.S. PATENT DOCUMENTS

Figure 1:
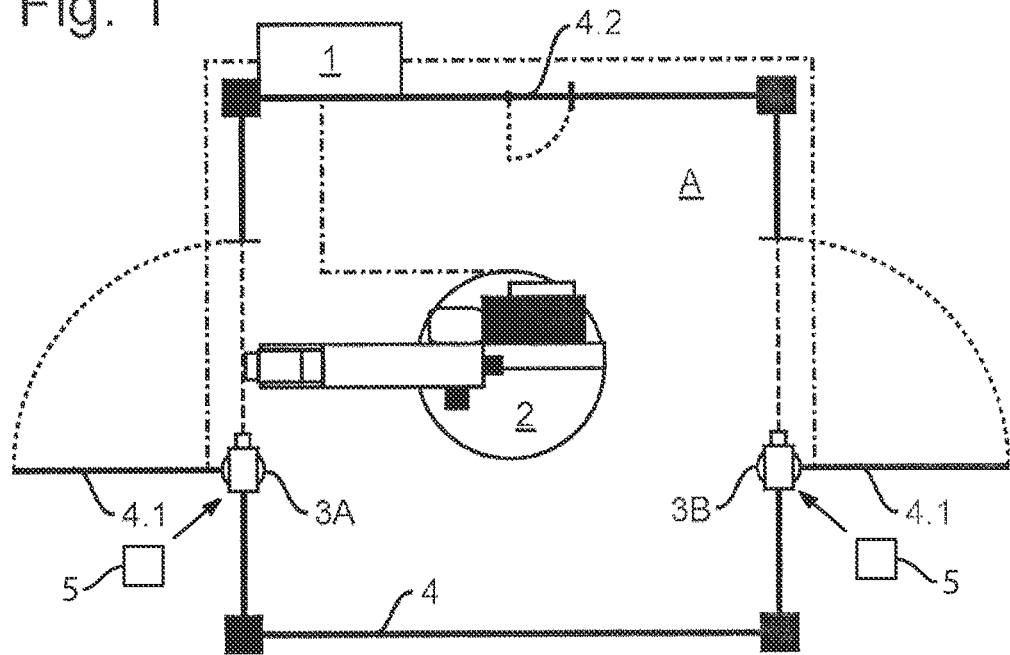

| | | |
|---|---|---|
| 2007/0211395 A1 | 9/2007 | Svensson et al. |
| 2009/0295580 A1 | 12/2009 | Inoue et al. |
| 2011/0282490 A1* | 11/2011 | Weigele et al. ............... 700/250 |

FOREIGN PATENT DOCUMENTS

| | | |
|---|---|---|
| CN | 101599205 A | 12/2009 |
| DE | 197 39 736 A1 | 3/1999 |
| DE | 101 52 543 A1 | 5/2003 |
| DE | 102 36 844 A1 | 4/2004 |
| DE | 10 2007 007 576 A1 | 8/2008 |
| DE | 10 2007 028 390 A1 | 12/2008 |
| DE | 10 2007 059 481 A1 | 6/2009 |
| DE | 10 2008 052 579 A1 | 4/2010 |
| EP | 1306603 A2 | 5/2003 |
| EP | 1932629 A1 | 6/2008 |

OTHER PUBLICATIONS

German Patent Office; Search Report in German Patent Application No. 10 2010 050 547.1 dated Jun. 21, 2013: 6 pages.

Chinese Patent Office; Office Action in Chinese Patent Application No. 201180025271.7 dated Jun. 5, 2014; 14 pages.

Chinese Patent Office; Search Report in Chinese Patent Application No. 2011800252717 dated Apr. 29, 2014; 2 pages.

* cited by examiner

METHOD AND APPARATUS FOR SECURE CONTROL OF A ROBOT

The present invention relates to a method and a device for monitoring the safety of a robot with a non-contact detection apparatus, in particular a laser scanner.

For monitoring safety of robots, it is known from practice on the one hand to monitor their working space with a non-contact detection apparatus. For example, access to an automation cell may be monitored using a laser that generates a light barrier or light curtain. Passage of introduced or removed work pieces other than as intended in operation, for example by an unauthorized person, triggers a safety response, for example a safety stoppage of the robot. The detection apparatus is designed to this end corresponding to the desired monitoring area.

It is also known from practice to detect joint positions of the robot and monitor them directly against predefined position limit values, or indirectly, for example after transformation to a Cartesian position of a TCP. However, if the actual kinematics of the robot deviate, for example as a result of a deformation after a collision, from theoretical kinematics, as used for example as the basis for the transformation to the Cartesian position of the TCP, under certain circumstances it may no longer be possible to recognize reliably a dangerous real TCP position on the basis of the detected joint position.

Independent thereof, it is known from practice to measure a robot by means of a non-contact detection apparatus provided for this purpose, in particular a laser scanner, in order to calibrate a control system, for example a kinematic model of the robot on which the latter is based, and thus to increase the precision, compensate for temperature drift or the like.

The object of the present invention is to improve the safety monitoring of robots.

This object is fulfilled by a device having the features of claim 1 and a method having the features of claim 7. Additional refinements are the subject of the subordinate claims.

A first aspect of the present invention is based on the idea of using a non-contact detection apparatus that is already necessary for monitoring the working space, preferably one or more lasers which monitor one or more access points to the working space by means of light barriers or curtains, to also measure a robot. One of the formerly two independent detection apparatuses can be advantageously saved thereby.

Accordingly, a device according to the invention for monitoring the safety of one or more robots has a non-contact detection apparatus, which in a monitoring mode monitors a working space of one or more robots, in particular an automation cell.

The monitoring may preferably include a non-contact scanning of the working space, for example using ultrasound, a non-contact detection of thermal and/or electromagnetic radiation and/or of an electromagnetic field, and/or an analysis of one or more images of the working space, in order to detect unintended objects within the working space. In a preferred embodiment, the detection apparatus is set up to monitor one or more points of access to the working space. In particular to this end, in a preferred embodiment, the detection apparatus may have one or more optical emitters, in particular lasers, which emit visible or invisible, in particular infrared or ultraviolet, electromagnetic radiation. The emitted radiation is captured by receivers. As this is done, in the same way a detection of uninterrupted radiation according to the principle of a light barrier or light curtain, or the detection of an object of reflected radiation, in particular the detection of the distance from the object on the basis of a beam travel time or a frequency shift, may be provided. Preferably, for the latter a receiver is situated in the vicinity of an emitter of the detection apparatus, however opposite the emitter, to detect uninterrupted radiation. With the emitters and receivers described above, the working space can be scanned without contact in the same way.

According to the invention, a means of switching over is now provided, which switches the detection apparatus, preferably optionally, for example after an input by an operator, or at prescribed times, in particular periodically, to a measuring mode in which one or more robots are measured.

If the detection apparatus, as constructed above, includes one or more emitters, in particular lasers, the latter may be used preferably to detect distances from one or more reference objects on a robot, in particular reflective markers, which together with the position and orientation of the emitter and receiver determine a Cartesian position of the robot-fixed reference object, and thus of the robot. It is equally possible instead to detect the contour of the robot by scanning, in particular using one or more lasers, or by analyzing an image.

In general, measuring a robot in the meaning of the present invention is understood to mean in particular the detection of a one-, two- or three-dimensional position and/or orientation of one or more robot-fixed reference features such as corners, edges, pivot points, reference objects and the like relative to each other and/or to a reference system, in particular one that is fixed in relation to a detection apparatus. When measuring one or more robots, in addition or alternatively the position and/or orientation of reference features of a robot relative to reference features of another robot may be detected.

A measurement result, in particular one or more of the forenamed reference feature positions and/or orientations, may then be compared in a preferred embodiment to a previous measurement result, in which case in both measurements in a preferred embodiment a robot is moved by the control system to the same pose, in particular with the same joint positions, in order to detect a change in the kinematics of the robot, for example due to collisions or thermal deformations. A measurement result, possibly after an appropriate transformation, may likewise be compared to a prescribed reference, for example the theoretical position of the TCP, which results from a kinematic model of the robot.

In a preferred embodiment, the detection device has two or more emitters, in particular optical emitters, which are spaced at a distance from each other. If for example multiple access points to a working space are provided, for example for introducing and removing work pieces on a conveyor running through the working space, and if each of the access points is monitored by at least one optical emitter and receiver, in particular a laser forming a light barrier or light curtain, then two or more emitters and receivers may be used in measuring mode to measure a robot. This may make it easier in particular to detect reference features distributed on a robot in the same robot pose.

While there is usually no provision in monitoring mode for detection of a robot by the detection apparatus, and for this purpose for example lasers that monitor access points are posted accordingly at the edge of the working space, according to the invention in measuring mode a robot to be measured must be located at least partially in a detection area of the detection apparatus in order to be measured by the latter. To this end, a working space of the robot provided in the safety monitoring system can be modified by the switching means in such a way that the robot is able to travel into the detection area of the detection apparatus in measuring mode, without a safety monitoring for example of joint positions responding. In general, it is provided in a preferred embodiment that in the measuring mode of the safety monitoring system a robot to be measured is moved at least partially into a detection area of the detection apparatus.

Preferably, the detection apparatus is designed, in particular it is positioned relative to the working space, so that in the monitoring mode it is able to monitor the working space entirely or partially, and in the measuring mode is able to measure one or more robots located therein. In an advantageous embodiment, an adjusting device can be provided that changes a detection area of the detection apparatus when the latter is switched between the monitoring and the measuring modes. Such an adjusting device may have in particular optical means such as lenses, mirrors, light guides and the like, and so may for example direct a laser beam optionally as a light barrier toward an access point or as a measuring beam toward the robot. Additionally or alternatively, a mechanical adjusting device, for example a sliding, rotating and/or panning device may be provided that changes the position and/or orientation of the detection apparatus when the latter is switched between the monitoring and the measuring modes.

If in the measuring mode the working space is not monitored by the detection apparatus some of the time, since the latter does not find a robot that is safely stationary, in particular being monitored safely at a standstill, in a preferred embodiment an additional safety means is provided to secure the working space, in particular an access point being monitored by the detection apparatus, and/or one or more robots, preferably only in the measuring mode.

In an especially simple design, this may be a mechanical barrier of an access that is no longer being monitored by the detection apparatus, for example a door. In addition or alternatively, safe standstill monitoring for example may be provided, for example by means of secure, in particular redundant monitoring of robot joint positions. In a preferred refinement, the additional security means for securing the working space and/or at least one robot may be coupled with the switching means using secure technology, in such a way that switching over to the measuring mode is only possible when the security means is active, or activates the security means. A means in the meaning of the present invention can be designed in general equally well in terms of software and/or hardware, in particular by means of one or more programs or subroutines or computers, which are preferably implemented in a robot control system or cell control system for a plurality of robots or may be constructed as an independent safety monitoring apparatus.

A second aspect of the present invention is based on the idea that a safety monitoring system on the basis of detected joint positions of a robot is only reliable if, among other things, a kinematic element, in particular axis intervals between the joints, does not deviate too greatly from a reference, for example a kinematic model of the robot. The invention therefore proposes that the robot be measured additionally by a non-contact detection apparatus, preferably at prescribed intervals, in particular periodically, and that a safety response be triggered if a deviation of a measuring result from a reference exceeds a prescribed limit. The second aspect can be combined in particular with the first aspect explained above.

According to the second aspect, one or more joint positions of a robot are detected. A joint position in the meaning of the present invention is understood here to mean in particular the position of a joint, for example the angular position of a swivel joint, but for a more compact depiction also a temporal derivative thereof, in particular a joint velocity; a detection is understood accordingly as the direct detection, in particular by means of a rotation or travel sensor, preferably a resolver or encoder, but also an indirect detection, for example according to time integration or differentiation.

The triggered safety response may include in particular a safety stoppage of the robot, preferably a STOP 0, STOP 1 or STOP 2, but also moving to a prescribed standstill position or reducing an operating speed of the robot.

In particular, if the first and second aspect are combined, in a preferred embodiment the measuring of the robot can be done using safe technology, in particular by means of redundant, preferably diverse apparatuses and/or methods.

As explained above, a measuring result may include in particular the position and/or orientation of one or more reference features of a robot. This can be compared, possibly after appropriate transformation, to a reference, in particular a kinematic model of the robot or a previous reference measurement, in which case a safety reaction is triggered if a deviation, for example a maximum or average deviation between values for the same variable, for example components of the Cartesian TCP position, exceeds a prescribed limit.

In a preferred embodiment, the robot is measured in various poses, the deviations from assigned references being ascertained in each case. This increases the reliability of the measurement. In an advantageous refinement, the references may be dynamic; i.e., they may depict the robot in its moved state. For example, a flexible robot arm may have more severe deformations during rapid movements as a result of its inertia. If these are taken into account in the dynamic reference, for example in positions of reference features, the robot can be measured while moving and the measurement result can be compared to the reference.

Figure 2:
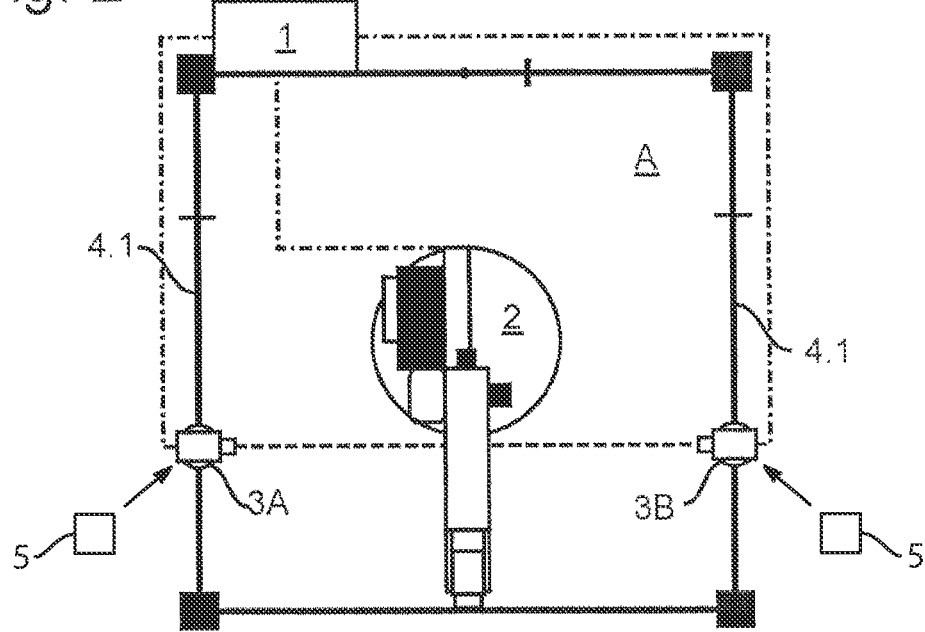

Additional advantages and features result from the subordinate claims and the exemplary embodiments. To this end the drawing shows the following, partially in schematic form:

FIG. 1: a safety monitoring system of a robot according to one embodiment of the present invention, in a monitoring mode; and FIG. 2: the safety monitoring system of FIG. 1 in a measuring mode.

FIG. 1 shows a top view of a six-axis articulated arm robot 2 in a working space A of an automation cell bounded by a protective fence 4. Provided in the fence 4 are, in addition to a normally closed access door 4.2, two access points located opposite each other, through which a conveyor introduces work pieces to and removes them from the cell (not shown).

The access points are monitored using secure technology by a safety monitoring device, which is implemented in a robot control system situated outside the cell, for example using independent computing means or integrated into the motion control system of the robot.

To this end, the device 1 is connected using secure technology on the one hand to the robot 2, by wire or by wireless signal connection, as indicated with the dash-dotted lines in FIG. 1. Resolvers at the joints of the articulated arm robot convey its joint positions, from which the safety monitoring device 1 ascertains for example the Cartesian position of the TCP and the joint velocities and monitors them against limits, in particular limits of the working space A or maximum velocities in the joints and/or of the TCP.

On the other hand, the safety monitoring device 1 is connected using secure technology to two laser scanners 3A, 3B, which in a monitoring mode (FIG. 1) monitor the opposing access points by means of a light curtain and to this end cyclically traverse the access points vertically, as indicated in FIG. 1 by dashed lines. The laser scanners 3A, 3B are attached to doors 4.1, which are provided for closing the access points.

It can be seen that on the one hand the robot 2 is not able to travel into the monitoring detection area of the laser scanners 3A, 3B (indicated with dashed lines in FIG. 1), since to do so it would have to leave its working space A. On the other hand, a deformation of the robot, for example as a result of a collision, could result in its TCP leaving the working space A, despite correct joint positions monitored by the resolver.

For that reason, the detection apparatus formed of the two laser scanners 3A, 3B is switched periodically by the safety monitoring device 1 from the monitoring mode depicted in FIG. 1, in which it monitors the opposing access points to the working space as a light curtain, to a measuring mode (FIG. 2). To this end, the safety monitoring device 1 operates an adjusting apparatus 5, which closes the doors 4.1 and at the same time also turns the laser scanners 3A, 3B attached to them to the working space. In addition, the safety monitoring device 1, for example by instructing the robot control system accordingly, causes the robot 2 to assume a measuring pose (FIG. 2), in which the two laser scanners 3A, 3B, now positioned opposite each other, scan the robot, for example detecting its contour or the position of reference objects such as markers (not shown).

The measurement result, for example the positions of detected markers, is compared to a reference, for example a previous reference measurement. If measurement result and reference deviate from each other by more than a prescribed limit, the safety monitoring device 1 recognizes that the robot kinematics have changed inadmissibly, and as a safety response it restricts for example the travel velocity of the robot to a prescribed limit.

On the other hand, if the deviation between measurement result and reference does not exceed the limit, the safety monitoring device 1 switches back to the monitoring mode (FIG. 1), in which the open access points enable introduction and removal of work pieces and are not monitored by the laser scanners, which are turned back, while the robot 2 is monitored on the basis of its joint positions, which can be transformed on the basis of the measurement into a secure TCP position. In an analogous way, in non-depicted variations the laser scanners 3A, 3B may also be turned back to monitor the access points, if no doors 4.1 are provided. In addition or alternatively to a mechanical motion, in particular rotation of the laser scanners, their detection areas may be switched between monitoring and measuring mode for example also by means of appropriately variable laser scanner optics (not shown).

REFERENCE LABELS 1 safety monitoring device
2 robot
3A, B laser scanner
4 safety fence
4.1, 2 safety door
A working space

The invention claimed is:

1. A device for monitoring the safety of at least one robot, comprising:
   a non-contact detection apparatus that, in a monitoring mode, monitors a working space of the at least one robot; and
   a controller communicating with the non-contact detection apparatus and selectively switching the detection apparatus from the monitoring mode into a measuring mode wherein the non-contact detection apparatus measures the at least one robot.

2. The device according to claim 1, wherein the detection apparatus monitors an access point to the working space in the monitoring mode.

3. The device according to claim 1, wherein the detection apparatus has at least one optical emitter for emitting electromagnetic radiation and at least one receiver for receiving the emitted electromagnetic radiation.

4. The device according to claim 1, wherein the detection apparatus has at least two emitters spaced at a distance from each other.

5. The device according to claim 1, further comprising an adjusting apparatus, the adjusting apparatus changing a detection area of the detection apparatus between a monitoring area, which is detected in the monitoring mode, and a measuring area, which is detected in the measuring mode.

6. The device according to claim 1, further comprising security means for securing at least one of the working space or a robot in the measuring mode.

7. A method for monitoring the safety of at least one robot, the robot having a safety monitor device according to claim 1, the method comprising:
   detecting at least one joint value of the robot;
   measuring the robot using a non-contact detection apparatus; and
   triggering a safety response if the deviation of a measurement result from a reference exceeds a prescribed limit.

8. The method according to claim 7, wherein measuring the robot comprises measuring the robot in various poses, and wherein the method further comprises ascertaining deviations of the poses from assigned references.

9. The method according to claim 7, wherein detecting at least one joint value of the robot comprises detecting the joint value using at least one rotation or travel sensor.

10. A method for monitoring the safety of at least one robot, comprising:
    monitoring a working space of the at least one robot using a non-contact detection apparatus;
    switching the non-contact detection apparatus from a monitoring mode to a measurement mode; and
    measuring the at least one robot using the non-contact detection apparatus.

11. The method of claim 10, further comprising:
    comparing the results of the measurement with at least one reference value; and
    implementing a safety function if the measurement deviates from the at least one reference value by a predetermined amount.

12. The device of claim 3, the optical emitter is a laser.

13. The device of claim 5, wherein the adjusting apparatus is at least one of an optical adjusting apparatus or a mechanical adjusting apparatus.

14. The device of claim 6, wherein the security means secures an access point of the working space monitored by the detection apparatus.

15. The method of claim 8, wherein the assigned references are dynamic references.

16. The method of claim 9, wherein detecting the joint value comprises detecting a joint position, and wherein the rotation or travel sensor is a resolver.

* * * * *